Jan. 26, 1960

D. K. SCHAEVE 2,922,930

POLARIZED RELAY AMPLIFIER CIRCUIT

Filed April 10, 1956

INVENTOR.

Donald K. Schaeve

BY Carlson, Pitzner, Hubbard & Wolfe

ATTORNEYS

United States Patent Office 2,922,930
Patented Jan. 26, 1960

2,922,930

POLARIZED RELAY AMPLIFIER CIRCUIT

Donald K. Schaeve, Rockford, Ill., assignor to Barber-Colman Company, Rockford, Ill., a corporation of Illinois Application April 10, 1956, Serial No. 577,390
10 Claims. (Cl. 317—148.5)

This invention relates to automatic control systems and has particular reference to a polarized relay amplifier circuit.

In many electric control systems an error signal from an input network is desirably employed to actuate a relay in response to the error direction and amplitude so that the error may be automatically corrected by a follow-up circuit. In temperature control applications, for example, where valve or damper control may be involved, the position of a first or master device, may control a resistor tap with respect to another resistor tap coupled to a second or slave device to be similarly positioned. A correction signal derived from the difference between the resistor tap positions is employed to change the position of a second device to correspond with the first device. Of course other conditions or stimuli may be employed to produce a useful electric signal varying with respect to a reference level and the signal may be employed in telemetering circuits generally.

Various problems have arisen in connection with the derivation and amplification of the error signal, not the least of which problems are limitations of space and cost.

Low signal amplitudes require power amplification for use in an actuator circuit, and relays are a relatively standard maintenance-free circuit component. In any event, one or more power supplies are required which are desirably simple and inexpensive. While a direct-current relay or responsive device is desirably employed as meeting these requirements, such a device must also be polarized to differentiate between errors in different directions. Vacuum tube amplifying systems have often been employed, but it is often desirable to reduce the standby power requirements and temperature rise typical of such systems.

It is therefore an object of my invention to provide an improved electric control system for deriving and correcting an error signal with a compact and low-cost equipment.

It is the further object of my invention to provide an improved polarized relay circuit having very simple power-supply requirements.

It is another object of the invention to provide a polarized relay circuit for deriving and amplifying an error signal utilizing a simple alternating current power supply with low-cost rectifying and filtering components.

It is a still further object of the invention to provide an amplifier circuit employing a bidirectional direct current responsive relay with an alternating current error input signal.

Other objects and advantages of the invention will become apparent as the description proceeds and in view of the accompanying drawings in which.

Figure 1:
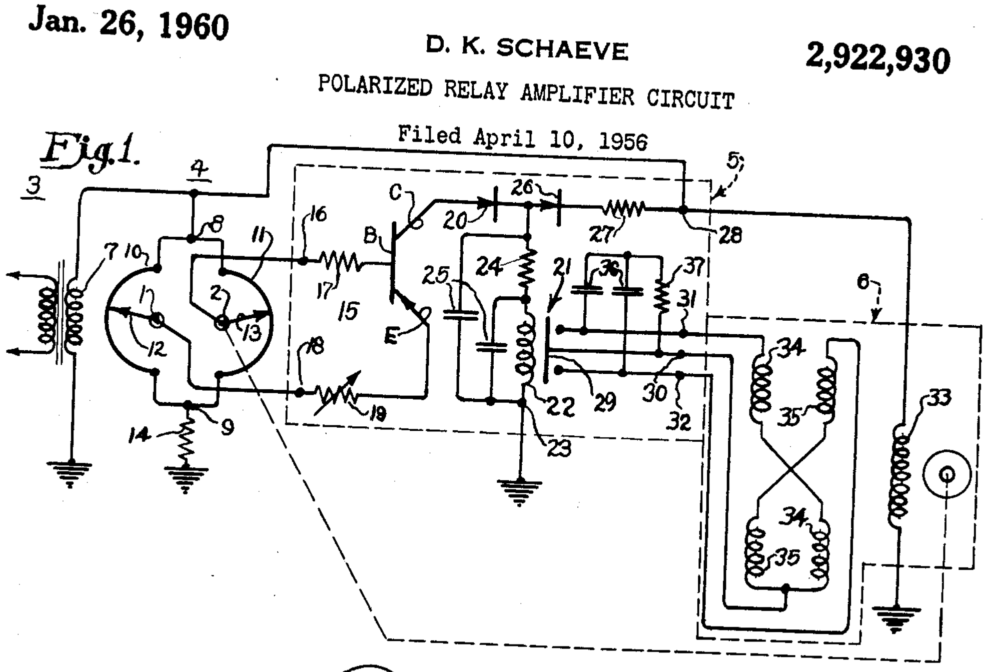
Figure 1 is a circuit diagram of an automatic control system incorporating the invention.

While the invention is susceptible of various modifications and alternative constructions, I have shown in the drawings and will herein describe in detail the preferred embodiments. It is to be understood that I do not thereby intend to limit the invention to the specific forms or modifications disclosed, but intend on the other hand to cover all such modifications, alternatives and equivalents falling within the spirit and scope of the invention as expressed in the appended claims.

Referring now to Figure 1, an apparatus embodying my invention is schematically indicated. As shown therein, rotatable shafts 1 and 2 represent the primary and secondary or master and slave elements whose relative angular position give rise to an error signal. Shaft 1 may for example, be coupled to a valve or damper and subject to rotation therewith. It is obvious, without departing from the spirit of the invention, that the angular position of the shaft 1 may be adjusted manually or made responsive to some external stimulus such as temperature or humidity. The shaft 2 may be coupled to a similar valve or damper or to an indicating device. A particular correspondence in angular position of shaft 2 with shaft 1 is the desired end so that regardless of the direction of angular displacement of shaft 1, shaft 2 will follow to the same end position in what may be termed parallel motion.

For accomplishing this result a circuit is provided which may be analyzed generally as an alternating current power source 3, a bridge circuit 4 for producing the error signal, an amplifier relay 5, and a restoring device 6 which in this case is a reversible motor having a shaft suitably mechanically coupled to the shaft 2.

The alternating current power supply is suitably derived in conventional manner to provide a suitably low-voltage single-phase voltage source. As shown in Figure 1, a stepdown transformer from a conventional 115 volt 60 cycle source may be employed with a transformer secondary winding 7 providing in the illustrated example 25 volts between its high and its ground terminals.

The bridge 4 is preferably a four-terminal Wheatstone bridge having connected between one pair of opposite terminals 8 and 9 the respective resistive windings of potentiometers 10 and 11. As shown in the figures, the windings each have a 180 degree distribution and are provided with respective wipers or variable taps 12 and 13 which serve as the other pair of opposite bridge terminals. The potentiometer 10 is associated with the shaft 1, as by mechanically coupling its wiper 12 to the shaft, and the second potentiometer is similarly coupled to the followup shaft 2. While the bridge circuit functions as such, it should be understood that physically the respective potentiometers are likely to be remotely spaced, depending upon the relative locations of the shafts 1 and 2.

To energize the bridge, terminal 9, shown as the lower terminal in Figure 1, is connected through a voltage dividing resistor 14 to ground, and the other terminal 8 is connected to the other side of the voltage supply line. The inclusion of the resistance of resistor 14 assures that a voltage will always be present between ground, as one of the voltage source terminals, and the lower terminal 9 of the bridge. In the example shown, the resistor 14 has a 50 ohm resistance and the parallel potentiometers each have 100 ohms resistance. The voltage between the bridge terminals 12 and 13 can vary in amplitude and in phase (with respect to the phase of the source). It may be seen that with wipers 12 and 13 in a horizontal position the voltage difference between them will be zero and will remain zero if each wiper is above or below the horizontal by the same angle. If the bridge were conventionally energized by a direct current source the position of the second wiper above or below the first wiper would be indicated by the polarity and amplitude of the voltage.

Figure 2:
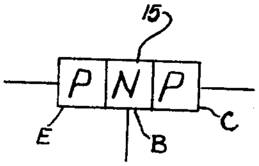
Fig. 2 is a representation of a transistor suitably employed in the circuit of Fig. 1.

Referring next to the amplifying relay unit 5, a transistor 15 is employed therein, the transistor preferably being of the germanium junction type having base, emitter, and collector electrodes respectively indicated as B, E, and C in Figs. 1 and 2. The base electrode B is connected to input terminal 16 of the relay amplifier through a resistor 17 which is inserted to assure limitation of the base-emitter current to a safe value. The emitter E is similarly connected to the other input terminal 18 through an adjustable resistor 19. The emitter resistor 19 is optionally employed and subject to adjustment in the event that the specified transistors themselves differ in characteristics. It may be omitted if the relay is not subject to replacement of transistors of different characteristics. With the terminals 16 and 18 connected to the wipers 13 and 12 as the outlet terminals of the bridge, an error signal is imposed as an alternating current voltage between the base and emitter.

The relay amplifier output circuit includes a rectifier or diode 20 and the actuating coil 22 of a polarized magnetic relay device 21. As shown in the drawing, the rectifier 20 is connected to the collector electrode C of the transistor 15 while the relay coil 22 is connected to ground or to a grounded output terminal 23 of the amplifier relay 5. An additional resistor 24 is preferably also included in the output circuit between the rectifier 20 and the relay coil 22 both to increase the resistance of the output circuit in the event a high-resistance coil 22 is not available and to serve as part of a smoothing filter together with filter capacitors 25 which are each connected between ground and the terminals of the resistor. The output circuit desirably has a fairly high resistance or impedance level, being in the order of 10,000 ohms or greater in the embodiment shown. In the particular example shown the resistor 24 is a half-watt 10,000 ohm resistor, and the capacitors 25 each have twenty-five microfarads capacitance and a twenty-five volt rating.

In accordance with my invention, the output circuit is energized from the same set of alternating voltage terminals as is the input circuit. A voltage at ground terminal 23 will appear with respect to the input circuit, regardless of whether or not the wipers 12 and 13 are at their lowest position, because of the voltage dividing resistor 14. However, and as later explained, the rectifier 20 is connected to prevent the application of a positive collector voltage and blocks current flow through the collector electrode during those alternate half cycles when the ground terminal 23 is positive with respect to the ungrounded line of the power supply. A second rectifier or diode 26 connects the relay coil 22 in circuit with the alternating current supply source 3 independently of the transistor 15. This rectifier is connected to the resistor 24 of the output circuit through an additional limiting resistor 27 (having, in this instance, a relatively high resistance of 27,000 ohms) to a relay terminal 28. The terminal 28 is connected to the ungrounded side of the power supply. Rectifiers 20 and 26 may each be inexpensive selenium diodes. They are subject to more forward resistance than some semiconductor diodes, but this can be tolerated in view of the large resistance in series with them. The diodes 20 and 26 may also be constructed as one device having two sections in series with a center connection to the resistor 24, but as utilized in the circuit of Figure 1, they are seen to be oppositely polarized with respect to relay coil current flow through either one of them.

The polarized or directional magnetic relay device 21 is required to respond selectively to the error signal direction. The relay device itself is of a conventional type for direct current operation and has an armature 29 which is balanced for a particular current, conventionally and most conveniently zero current, through the actuating coil 22. A current in one direction closes a relay contact between an armature terminal 30 and a first electrode or pole terminal 31. A current in the other direction closes a circuit between the armature terminal 30 and the terminal 32 of a second electrode or pole. The relay is thus in effect a single-pole double-throw switch to provide selective energization of the relay load circuit in accordance with the direction of the relay coil current with respect to the zero point. The zone or current range within which the relay is balanced so that both contacts are open is preferably very small.

In order that the relay may operate with the required precision the smoothing filter capacitors 25 are adequate to prevent chattering of the direct current relay. In accordance with my invention, this end can be inexpensively achieved in view of the high impedance or resistance level of the transistor load circuit. Similarly, the rectifiers 20 and 26 need not for a given power circuit be rated for the high currents as would be required, for example, if the same power were required for the relatively low resistance input circuit. Likewise, as will be further explained, conventional full-wave rectification is not required to permit accurate direct current operation of the polarized relay, the two rectifiers 20 and 26 providing separate half-wave rectification of different output signal components.

The rebalancing circuit 6 is that of the motor, which is suitably a shaded-pole reversible alternating current type. Such motors suitably have a very few watts input power and are usually employed with a speed-reducing gear train for control operations. In the present instance the motor has a field coil 33 which is connected across the 25-volt alternating current power source terminals and shading circuit coils 34 and 35. The shading coils have a common tap connected to relay switch terminal 30 and their ends connected to terminals 31 and 32 respectively. Arc suppression capacitors 36 are shown connected respectively to electrode terminals 31 and 32 and through a common resistor 37 to armature terminal 30 as a precaution against undue electrode erosion. With one or the other of the switch contacts closed the motor will run in the selected direction. When the relay is balanced so that neither contact is closed, the motor stops. Any suitable mechanical coupling between the motor and the shaft 2 is provided so that the motor may drive the shaft to reduce the error signal, whatever its direction, until the shaft 2 corresponds in position with the shaft 1 and the polarized relay is balanced.

Referring now more particularly to the distinctive mode of operation of the circuit, a better appreciation of the amplifier relay unit may be gained by considering the polarities involved in a typical installation. The transistor 15 may, for example, be of the P–N–P polarity (Positive-Negative-Positive) in which the base B is the N-type material. Such a junction transistor incorporates rectifying barriers which have a very low impedance to current flow (which should be understood to be in the direction opposite to electron flow) from a P-zone to an N-zone, and a very high impedance (preferably essentially non-conducting) in the other direction. With the named polarization, the current from the emitter E to the base B is in the easy-flow direction. Thus a small positive voltage on the emitter E with respect to the base B is all that is required for the typically relatively large emitter current flow. When the collector C is biased negatively with respect to the base B (and thus in the reverse or high impedance direction) the current is restricted to a very small value when no emitter current flows. However, as characteristic of the transistor operation, the collector current increases with emitter current flow, the emitter being considered to inject conductor carriers which are attracted to the collector rather than to the less negative base electrode. The ratio of the collector current increase with respect to the emitter current increase for a given collector voltage is the amplification factor alpha ($\alpha$). While the current gain is somewhat less than unity for junction transistors, the output resistance of the amplifier is very much higher than the input resistance, and a substantial power gain is realized. In effect, the circuit operates as an impedance changing means as well as a power amplifier.

Accordingly, with the transistor polarity mentioned the rectifier 20 is polarized or connected to block current flow through the collector in the easy-flow direction, the diode blocking out what may be termed the positive (and hence inactive) alternate half cycles. Assuming for the moment the absence of any connections to terminal 28, it may be seen that during the active half cycles, current will flow through the output circuit to energize the relay when the emitter has a positive voltage with respect to the base. The smoothing filter smooths the half-wave pulses to prevent buzzing of the relay contacts. It will be appreciated that the positive emitter voltage will be obtained only when the wiper 13 is below the wiper 12 so that, as thus far described, error signals of one direction only are indicated or corrected.

The function of the second diode 26 is to provide what may be termed a bias or off-set current through the relay coil 22 from the power supply during the transistor inactive half cycles and the second diode is accordingly so polarized or connected. The diodes 20 and 26 are, in effect, connected in unopposed series relation from the collector to the ungrounded side of the alternating current line but no significant currents pass through such a high impedance circuit. The relay coil current flow during the inactive half cycles is of a constant average value and is smoothed by the filter elements over the complete cycle period. The average relay coil current is thus the average transistor collector current minus the average bias current. Bidirectional operation of the relay is thus provided, the midpoint of the relay corresponding to zero net coil current.

In the operation of the circuit of Figure 1 it will be appreciated that a certain constant offset between the positions of the two potentiometer wipers is involved. This follows from the fact that for a relay deadband centered on zero current through the relay coil, the reverse bias current introduced through the diode 26 must be counterbalanced by the collector current due to a positive voltage on the emitter. Since this positive voltage is significant only during the active transistor half cycles, it will be seen that with the P–N–P transistor and the connections shown in Figure 1, the wiper 13 must be correspondingly lower in position than the wiper 12. For a given value of resistance of resistor 27 the offset angle remains substantially the same for all potentiometer positions. The devices to which the shafts 1 and 2 are connected may accordingly be positioned for zero error, i.e., for the desired parallelism when the wipers vary in angular position by the offset angle. It will be further appreciated that while the response of the transistor output circuit is not linear in that the magnitude of the current through the relay coil does not vary with the amount of the error displacement, the follow-up or balancing operation is not adversely affected. On the other hand, the signal varies in direction in accordance with the departure of the potentiometer wipers from their zero reference position and it is this direction which controls the relay contacts and which maintains them selectively closed until the motor 6 has restored balance to the system.

Figure 3:
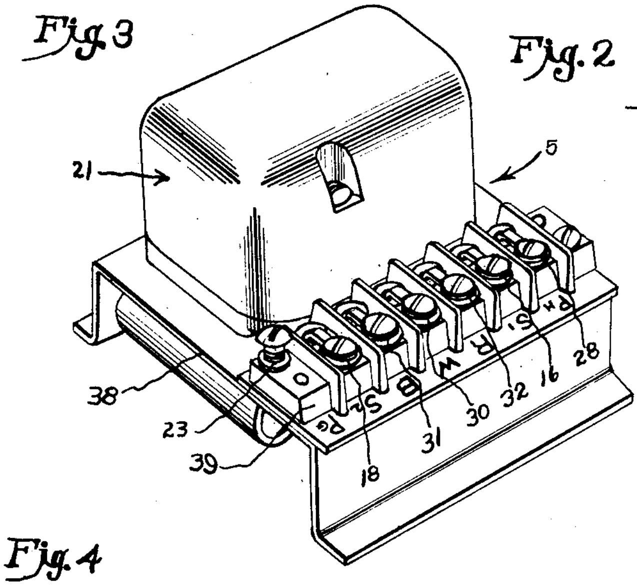
Fig. 3 is a perspective view illustrating the compact relay unit employed in the circuit of Figure 1.

Fig. 3 illustrates a relay amplifier unit 5 embodying the advantages made possible by the circuit shown in Figure 1. As may be seen from the figure, the unit 5 has a small compact chassis 38 carrying a terminal strip 39 provided with the terminals indicated in Figure 1 for the power supply, bridge output, and motor shading coils. On the upper side of the chassis as shown is the case of the magnetic relay device 21 which is suitably plugged into a socket on the chassis. The underside of the same chassis accommodates the capacitors, the resistors, the diodes, and the transistor. A minimum of standby power is required, which, while generally characteristic of transistor circuits, is achieved here more fully since only one transistor is involved and the rectification and filtering losses are relatively small. Likewise, the standby temperature rise is minimized.

Figure 4:
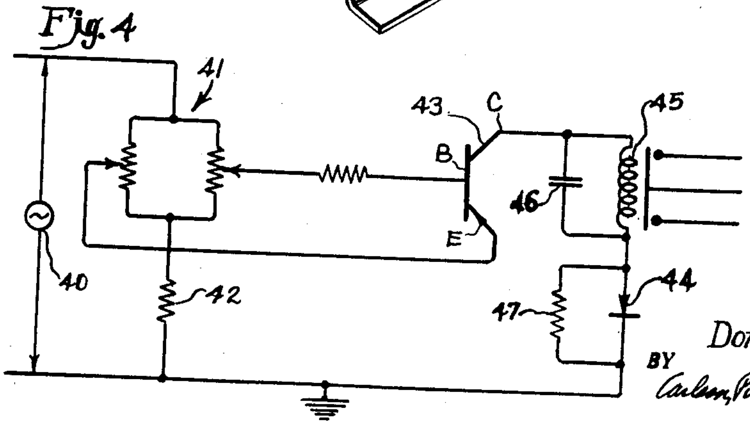
Fig. 4 is a schematic diagram of a modified circuit.

Referring now to Fig. 4, a modification of the circuit of Figure 1 is shown. Here again a single alternating current source 40 is employed, across which is connected a four-terminal bridge 41 in series with a dropping resistor 42. This bridge is more generally indicated than that of Figure 1, but it may be understood that the variable resistance arms of the bridge circuit need not be physically adjacent each other. An error signal in the bridge between two opposite corners is produced by changes of the bridge arm resistance to change the emitter to base voltage of a transistor 43 suitably similar to that previously described. A transistor load circuit comprising a diode 44 and a high resistance energizing coil of a polarized relay 45 are connected in series between the transistor collector and one side of the alternating current line. A simplified filter circuit 46 is shown as an example of various filter modifications that may be made, the filter in this case comprising a capacitor connected across the relay coil. As previously described, the diode 44 would block transistor operation to allow collector current flow only during those desirably active half cycles when the collector is not biased in the easy flow direction.

In order to obtain a reverse current component, a reverse bias resistor 47 is shunted across the diode as further shown in Fig. 4. This resistance, while relatively high with respect to the forward conductance of the diode during the active half cycles does permit a limited collector current flow during the other half cycles. With a N–P–N transistor, for example, a significant current flow through the shunting resistor is obtained during those half cycles when the relay coil terminal is at a negative polarity with respect to the other voltage source terminal connected to the upper side of the bridge. The bias current is not independent, however, of the position of the potentiometer wiper arms, as in the case where two diodes are employed, and the off-set between the shafts is not constant with the position of the sliders. However, only one connection from the relay unit to the power source is required, this suitably and conveniently being the ground connection, and such a construction may be alternatively chosen in arrangements where a minimum number of components is sought.

The polarized relay may also be mechanically biased or offset so that a fairly substantial coil current flows in the null position (where neither set of contacts is closed). This has been avoided in the circuits of Figs. 1 and 4 to eliminate the relay inventory and maintenance problems accompanying a departure from the standard practice. Further, it may be understood that while the source of input signals may be conveniently and economically derived from a passive bridge or balancing network of the general type indicated in the description of the foregoing embodiments, the signal source need not in all instances be so designed. It may, for example, include impedance elements generally as well as resistors but should provide a path for the flow of direct current in view of the utilization of the rectifying properties of the transistors involved.

I claim as my invention:

1. A relay amplifier energized from a two-terminal alternating power source comprising a low-resistance four-terminal bridge subject to resistance unbalance by a change in an external condition, a junction transistor, and a relatively high resistance output circuit having in series a direct-current sensitive relay energizing coil and a rectifier diode, means connecting one pair of opposite terminals of said bridge to the base and emitter electrodes of said transistor, means connecting the other pair of opposite bridge terminals to said power source, and a smoothing filter in said output circuit, said output circuit being connected between said collector electrode and one of said power source terminals with the rectifier diode connected to permit conduction during emitter-controlled alternate half cycles through the base-collector junction to provide a direct current through said coil responsive in amplitude to the bridge unbalance.

2. A directional relay amplifier energized from a two-terminal alternating power source comprising a low-resistance four-terminal bridge subject to resistance unbalance by a change in an external condition, a junction transistor, and a relatively high resistance output circuit having in series a direct-current sensitive relay energizing coil and a rectifier diode, means connecting one pair of opposite terminals of said bridge to the base and emitter electrodes of said transistor, means connecting the other pair of opposite bridge terminals to said power source, a smoothing filter in said output circuit, said output circuit being connected between said collector electrode and one of said power source terminals with the rectifier diode connected to permit conduction during emitter-controlled alternate half-cycles through the base-collector junction, and means for providing reverse current of a given average amplitude through said coil during the other alternate half-cycles in opposition to the average value of current during said emitter-controlled alternate half cycles for energizing said relay coil with a net average direct current responsive to the bridge unbalance.

3. A directional control relay comprising a four-terminal impedance bridge, means for connecting one pair of opposite terminals to the terminals of an alternating current voltage source to provide an alternating current signal across the other pair of opposite terminals corresponding in phase and amplitude to the bridge unbalance, a transistor having base, emitter, and collector electrodes, means for connecting said base and emitter electrodes to said other pair of opposite bridge terminals, and a relatively high resistance load circuit comprising a direct current sensitive load device and a unidirectional conductive device connected in series between said collector electrode and one of said voltage source terminals, said unidirectional conducting device being polarized to block collector conduction in the forward direction.

4. In a relay amplifier a transistor having base, emitter and collector electrodes, an input circuit comprising a source or input signals of given frequency subject to phase and amplitude variation connected between said base and emitter electrodes, and an output circuit comprising, in series, a direct current sensitive load device, a unidirectional conductive device, and a power supply source of said given frequency connected in series between said collector electrode and said input circuit, said undirectional conducting device being polarized to block collector conduction in the forward direction during alternate half cycles.

5. A directional control relay comprising a four-terminal impedance bridge, means for connecting one pair of opposite terminals to the terminals of an alternating current source to provide an alternating current signal across the other pair of opposite terminals corresponding in phase and amplitude to the bridge unbalance, a transistor having base, emitter, and collector electrodes, means for connecting said base and emitter electrodes to said other pair of opposite bridge terminals, a relatively high resistance load circuit comprising a polarized direct-current sensitive load device and a unidirectional conducting device connected in series between said collector electrode and one of said alternating source terminals, said unidirectional conducting device being connected to block collector-base conduction in the forward direction during alternate half-cycles, and means for providing a direct current bias current through said load device during said alternate half-cycles.

6. A directional control relay as in claim 5 in which the last-named means comprises a resistor connected in snunt across said unidirectional conducting device.

7. A directional control relay as in claim 5 in which the last-named means comprises a second unidirectional conducing device connected in circuit between said load device and the other one of said alternating source terminals.

8. A directional relay amplifier energized from a two-terminal alternating power source comprising a low-resistance four-terminal bridge subject to resistance unbalance by a change in an external condition, a junction transistor, and a relatively high resistance output circuit having in series a direct-current sensitive relay energizing coil and a rectifier diode, means connecting one pair of opposite terminals of said bridge to the base and emitter electrodes of said transistor, means connecting the other pair of opposite bridge terminals to said power source, a smoothing filter in said output circuit, said output circuit being connected between said collector electrode and one of said power source terminals with the rectifier diode connected to permit conduction during emitter-controlled alternate half-cycles through the base-collector junction, and a second rectifier diode connected between the other of the power source terminals and the relay coil to permit a fixed bias current during the other alternate half cycles for providing an average direct current direction responsive to the direction of bridge unbalance.

9. A telemetering system comprising a first potentiometer having a variable tap position responsive to an external condition, a second potentiometer having a variable tap to be correspondingly positioned, means for connecting said potentiometers in parallel between the first and second terminals of an alternating current voltage supply, a transistor having base, emitter, and collector electrodes, means for connecting said potentiometer taps to said base and emitter electrodes respectively to provide an alternating input signal, a polarized relay actuating coil having one terminal connected to one of said voltage source terminals and having the other end connected to the other voltage source terminal through a first unidirectional conducting device and to the collector electrode through an oppositely polarized second unidirectional conducting device, and filtering means in circuit with said coil to smooth the rectified impulses to an average value.

10. A telemetering system comprising a first potentiometer having a variable tap position responsive to an external condition, a second potentiometer having a variable tap to be correspondingly positioned, means for connecting said potentiometers in parallel between the ungrounded terminal of an alternating current power supply, and a resistor connected to the ground terminal, a junction transistor having base, emitter, and collector electrodes, means for connecting said potentiometer taps to said base and emitter electrodes respectively to provide an alternating input signal, an output circuit comprising a first rectifier diode and a direct current polarized relay actuating coil connected in series, said diode being connected to said collector electrode and said actuating coil being connected to said ground terminals with the diode polarized to block current in the easy-flow direction through said collector at alternate half-cycles, a second rectifier diode connected between the ungrounded supply terminal to the common connection of said first diode and said coil to provide a bias current in the coil during said alternate half-cycles in the opposite direction, and filtering means incorporated in said output circuit to smooth the current impulses to an average value.

References Cited in the file of this patent

UNITED STATES PATENTS

| | | |
|---|---|---|
| 2,377,506 | McWhirter et al. | June 5, 1945 |
| 2,774,021 | Ehret | Dec. 11, 1956 |
| 2,781,505 | Grant | Feb. 12, 1957 |
| 2,828,450 | Pinckaers | Mar. 25, 1958 |

FOREIGN PATENTS

| | | |
|---|---|---|
| 744,089 | Germany | Jan. 17, 1944 |